United States Patent [19]

Rickman

[11] Patent Number: 4,973,464

[45] Date of Patent: Nov. 27, 1990

[54] METHOD FOR THE REMOVAL OF CYANIDES FROM SPENT POTLININGS FROM ALUMINUM MANUFACTURE

[75] Inventor: William S. Rickman, Leucadia, Calif.

[73] Assignee: Ogden Environmental Services, San Diego, Calif.

[21] Appl. No.: 313,581

[22] Filed: Feb. 21, 1989

[51] Int. Cl.$^5$ .............................................. C04B 18/14
[52] U.S. Cl. ................................. 423/461; 423/460; 423/DIG. 20; 423/119
[58] Field of Search ............... 423/460, 461, 364, 372, 423/371, 118, 119, DIG. 20; 204/67; 210/904

[56] References Cited

U.S. PATENT DOCUMENTS

| | | | |
|---|---|---|---|
| 1,871,723 | 8/1932 | Morrow | 423/116 |
| 4,053,375 | 10/1977 | Roberts et al. | 204/67 |
| 4,113,832 | 9/1978 | Bell et al. | 423/119 |
| 4,158,701 | 6/1979 | Andersen et al. | 423/119 |
| 4,160,808 | 7/1979 | Andersen et al. | 423/119 |
| 4,160,809 | 7/1979 | Andersen et al. | 423/119 |
| 4,184,456 | 1/1980 | Taylor et al. | 110/245 |
| 4,241,670 | 12/1980 | Blaskowski et al. | 110/245 |
| 4,275,668 | 6/1981 | Daman | 110/245 |
| 4,426,936 | 1/1984 | Kuo | 110/245 |
| 4,434,726 | 3/1984 | Jones | 110/245 |
| 4,444,740 | 4/1984 | Snodgrass et al. | 423/483 |
| 4,474,119 | 10/1984 | Jones | 110/245 |
| 4,597,774 | 7/1986 | Garcia-Mallol | 422/145 |
| 4,763,585 | 8/1988 | Rickman et al. | 110/346 |
| 4,889,695 | 12/1989 | Bush | 423/461 |
| 4,900,535 | 2/1990 | Goodes et al. | 423/484 |

FOREIGN PATENT DOCUMENTS 2059403 8/1979 United Kingdom .

OTHER PUBLICATIONS

"Laboratory Feasibility Studies for the Fluidized-Bed Combustion of Spent Potlinings from Aluminum Reduction," Kim et al., Report No. EPA-600/2-84-064, Mar. 1984.

Primary Examiner—Gary P. Straub
Assistant Examiner—Stephen G. Kalinchak
Attorney, Agent, or Firm—Fitch, Even, Tabin & Flannery

[57] ABSTRACT

A process for the treatment of ground, spent potlinings generated during the production of metallic aluminum to reduce cyanide content to environmentally nonhazardous levels. Potlinings are ground or otherwise suitably reduced in size to a particle size of not greater than about 2 inches in any dimension and roasted in a stream of air or nitrogen at a temperature between about 500° F. and 1400° F. Roasting for an appropriate time-temperature interval reduces cyanide content to desired levels without combustion of a major portion of carbonaceous material, resulting in an end product rich in carbon and fluorine which may be salable because of this content.

16 Claims, No Drawings

METHOD FOR THE REMOVAL OF CYANIDES FROM SPENT POTLININGS FROM ALUMINUM MANUFACTURE

FIELD OF THE INVENTION

This invention relates to methods for the removal of cyanides from spent potlinings resulting from the manufacture of aluminum in order to reduce cyanide levels in such materials to levels that are considered acceptable under current governmental regulations.

BACKGROUND OF THE INVENTION

Aluminum is conventionally manufactured by the electrolysis of alumina ($AL_2O_3$) which is reduced to metallic aluminum. The reduction is carried out in a bath of fused cryolite ($3NaF \bullet ALF_3$) that is maintained within a pot having a carbonaceous potlining, with the pot serving as the cathode in an electrolysis reaction at about 1600°F. to about 1800°F. During use over extended periods of time, the carbonaceous potlinings of such pots gradually deteriorate as the materials in the pot penetrate into the carbonaceous lining material, resulting in ultimate leakage of the bath and of metallic aluminum.

Hundreds of thousands of tons of spent potlinings are generated each year in the production of aluminum. Spent carbonaceous potlinings, as a result of their use, deterioration and penetration by bath materials, contain significant quantities of fluorides as well as aluminum, alkali metals, nitrides, and some cyanides. Because spent potlinings comprise certain materials, such as some fluorides and cyanides, which are categorized as hazardous wastes, the generation, storage and disposal of the potlinings have an environmental impact. Because a significant portion of spent potlinings is carbonaceous material, burning or combustion of such spent potlinings is one way of potentially meeting the disposal problems. Indeed there are a number of U.S. patents which are directed to this general concept; for example, U.S. Pat. Nos. 4,444,740 to Snodgrass et al. and 4,053,375 to Roberts et al. are concerned with the alleviation of a potential environmental problem with the output of such a combustor and with the recovery of some reusable material, such as cryolite or fluorine, from the potlinings. More recently, U.S. Pat. No. 4,763,585 to Rickman et al. discloses the burning of spent potlinings that have been reduced to particulate size under fluidized bed conditions where agglomeration of the bed material is positively prevented.

Although combustion of spent potlinings can provide an efficient means for destroying carbonaceous potlinings and cyanides contained therein, it requires relatively high temperatures, and oftentimes economic usage cannot be made of the high temperature effluent stream that is created. For example, stable combustion of spent potlinings has been found to require temperatures which exceed 1400°F. Maintenance of these temperatures may be undesirable and uneconomical, and other treatment methods have been sought after.

SUMMARY OF INVENTION

The invention provides relatively low temperature methods for the treatment of spent carbonaceous potlinings, which are generated during the electrolytic production of aluminum, to reduce cyanide levels to or below environmentally acceptable limits. It has been found that low temperature roasting of carbonaceous potlinings which have been comminuted or otherwise suitably reduced in size provides a safe and ecologically sound process for reducing cyanide levels in spent potlinings to such an extent that they are no longer environmentally hazardous. Moreover, the resultant roasted material may even constitute a salable product, e.g., a fuel source for the generation of thermal energy or a feed material for the steel industry, the mineral wool industry or the cement industry.

DETAILED DESCRIPTION OF THE PREFERRED EMBODIMENT

The invention provides a method for the treatment of spent potlinings used in aluminum to significantly reduce cyanide levels without substantial combustion. They are ground or otherwise suitably reduced in size to a particle size of not greater than about 2 inches in any dimension, and the particulate material is then roasted at a temperature in the range of from about 500°F. to about 1300°F., in an inert, e.g. $N_2$ or an $O_2$-containing (e.g., air) atmosphere. Preferably a temperature of at least about 800°F. is employed. As used herein, spent potlinings means carbonaceous potlinings used in the conversion of aluminum oxide to metallic aluminum which have suffered deterioration.

Experimentation shows that the cyanide content of ground potlinings can be significantly reduced under relatively low temperature, economically feasible conditions to produce material that is no longer categorized as environmentally hazardous. It has been found that, by roasting particulate potlinings at temperatures of at least about 500°F. in an air or nitrogen atmosphere, significant reduction of cyanide content occurs in reasonable time periods. Although temperatures as high as 1400°F. might be employed in a nitrogen atmosphere, lower temperatures are preferably used in an air atmosphere to avoid excessive combustion of the carbonaceous material. Preferably, roasting is carried out at a temperature of at least about 800°F., and most preferably at temperatures between about 1000°F. and about 1200°F. for a suitable length of time to obtain the lowered cyanide content desired.

The volatilization of the cyanide content will likely require some treatment of the stack gases in order to avoid the discharge of volatile cyanides into the atmosphere. For example, the stack gases could be supplied to an afterburner to burn cyanides and other combustible volatiles, or suitable scrubbing equipment might be employed. Therefore, the presence of cyanides in the stack gases should not deter commercial implementation of the roasting process.

As a result of experiments carried out both in air and in nitrogen, it is concluded that a combination of volatilization and pyrolysis constitutes the predominant mechanism by which cyanide content is reduced, as opposed to oxidative combustion which is known to occur in an oxygen-containing atmosphere at temperatures of 1400°F. and above. It is found that such roasting treatment can obtain the desired reduction in cyanide content at temperatures below those which are normally required for the combustion of cathodic carbon, so that the combustion of the carbonaceous material is purposefully minimized and at least 75% of the carbonaceous material remains following conclusion of the treatment. Preferably, the temperature and duration of treatment are such that not more than about 10% or 15% of the carbonaceous material is oxidized. There are two extremely favorable results which flow from such treatment. The rate of throughput of the particulate potlinings through the processing equipment is very substantially increased over that of a comparable combustion process, thereby having lower oxygen and heat removal requirements, and the end result is a carbonaceous product containing fluorides which can potentially be sold for use as a feedstock for certain processes or as a feed material for power or process heat generating plants.

Still another advantage of this low-temperature treatment process for reducing cyanide content is the ability to operate well below temperatures at which troublesome agglomeration caused by ash fusion occurs. A very significant advantage lies in avoiding potential agglomeration problems which are of substantial concern when a combustion method of treatment of spent potlinings is employed, and by avoidance of this potential problem, not only is furnace design simplified but operating costs are concomitantly reduced. As a result, practically any type of furnace may be used for the roasting method, including furnaces which operate either in batch or continuous modes. For example, moving grate, belt or suspension furnaces, rotary or shaft kilns, fluidized-bed or circulating-bed combustors, or other type of gas-solid contactors, such as the Herreshoff type furnace, can be employed. Similarly, any suitable heat source can be employed. For example, the energy may be supplied by direct-fired combustion, indirect-fired combustion, or even electrical resistance or inductance heating. As used herein, a combustor is a device with a chamber where combustion normally occurs, and fluidized-bed treatment is a method of treating material which is continually maintained in the form of a bed of particles supported by upflowing air or other gas which causes the bed to behave like a turbulent liquid. A fluidized-bed combustor may include a chamber whose floor is slotted, perforated, or fitted with nozzles to uniformly distribute upflowing air or gas. The chamber is partially filled with appropriately-sized particles which fluidize when the desired upward flow rate of air or nitrogen is established. When fluidization takes place, the bed of material expands and exhibits the properties of a liquid. When the gas velocity increases, the particles mix more violently, and the surface of the bed may take on the appearance of a boiling liquid. A circulating bed combustor is a type of fluidized-bed combustor wherein the fluidized-bed travels or moves through more than one physical zone.

Crushed spent potlinings are generally used, and after crushing, the potlinings may be particulatized or comminuted using a hammer mill, a jaw crusher or any other means for particulatizing relatively hard material. Grinding may also be employed to produce potlining particles which are less than about two inches in any dimension. Preferably, the spent potlinings are initially crushed and/or otherwise reduced to chunks no more than about 2 inches in largest dimension, and preferably at least about 50 weight percent of the spent potlinings are between about 1 and about 2 inches in their largest dimensions. More preferably, the major portion of the crushed potlinings are less than about an inch in largest dimensions. Operating with a particle feed of about this magnitude, which is herein referred to as ground or particulate potlinings, a treatment temperature is preferably chosen so that a residence time of between 5 and 15 minutes, most preferably about 10 minutes plus or minus two minutes, will achieve the desired reduction in cyanide content from an initial content of between about 500 and about 10,000 p.p.m. to a level of not more than about 100 p.p.m. Of course, should higher original cyanide values be present, or should it become necessary to reduce cyanide contents even lower, proportionately longer periods of roasting may be used. It should be understood, of course, that a time-temperature relationship is involved and that even within the limits herein stated, the use of a slightly higher temperature will permit a slightly shorter duration of treatment, whereas, if energy conservation is of more importance, then a lower temperature treatment can be employed for a slightly longer period of time.

Specific testing of spent potlinings having an initial cyanide content of about 1150 p.p.m., which are crushed to have a maximum size between about 1/16 inch and about ¼ inch is carried out by heating in a fluidized-bed. The major weight fraction of these ground particles is greater than about 1/12 inch in size. The heating is carried out in an electric furnace with the heat being supplied by resistance heating, and an upwardly flowing hot gas stream is used at a velocity of about 1-3 feet per second and at varying temperatures. Tests are run for 10 minutes duration and for 1 hour duration at different temperatures between 800°F. and 1400°F., employing either a heated air stream or a heated nitrogen stream. The results of these tests are set forth in Table 1 hereinafter, in terms of residual cyanide content in p.p.m. (parts per million). Current environmental standards in the United States generally classify waste material carbonaceous substances having a cyanide content of 100 p.p.m. or greater as potentially environmentally hazardous.

TABLE 1

CYANIDE DESTRUCTION-PARAMETRIC TEST RESULTS
Residual Cyanide Content, p.p.m.

| | Air | | Nitrogen | |
|---|---|---|---|---|
| | 10 min. | 60 min. | 10 min. | 60 min. |
| 800° F. | 105 | 188 | 107 | 119 |
| 1000° F. | 100 | 90 | 108 | 54 |
| 1200°° F. | 47 | 46 | 40 | <0.5 |
| 1400°° F. | 12 | 4 | <0.5 | <0.5 |

It can be seen from Table 1 that, for 60 minutes of roasting treatment in a nitrogen atmosphere, the cyanide content is reduced to a lower level than the comparable treatment in a heated air stream. Whereas treatment for 10 minutes duration results in about equal reduction in cyanide content at temperatures between 800°F. and 1000°F., at the higher temperatures, treatment in the nitrogen stream produces a product having a lower residual cyanide content than does comparable treatment in a stream of air. It is indeed surprising that greater reductions in cyanide content result from treatment in a nitrogen stream than in an air stream at comparable temperatures; however, perhaps one explanation of this difference in results is that the mechanism of reaction in a 100% nitrogen stream is that of pyrolysis rather than oxidation. Moreover, whereas no combustion of the carbonaceous material occurs during the roasting treatment in a nitrogen stream, some combustion occurs during heating in the air stream; however, the amount is dependent upon the temperature. For example, treatment for 10 minutes at 800°F. in air results in combustion of about 1 or 2 percent of the carbonaceous material initially present, whereas treatment for 10 minutes at 1400°F. in air results in combustion of about 60 percent of the carbonaceous material.

In general, the product of the roasting treatment resembles the feed with the exception that it has markedly lower cyanide levels, all the moisture has been removed, and some combustion of the carbonaceous material may have occurred. In any event, it is expected that this material will be useful as a raw material in various industries because of its high carbon and fluoride values. And thus, the removal of the potentially hazardous cyanide content without deleterious effect upon the fluoride and carbon values is considered to be particularly beneficial. It may, for example, be expected to find use as a feedstock for the mineral wool industry and for steel producers, as well as in the cement industry.

The following example is provided to illustrate the invention more fully; however, it should not be construed as limiting the scope of the invention, as many variations of the roasting methods are contemplated.

EXAMPLE I

As a comparison between the roasting treatment and a combustion mode of treatment, ground chunks of spent potlinings having a cyanide content of about 2,000 p.p.m. and having a maximum size of about ½ inch are fed to a circulating-bed combustor about 36 inches in diameter through a side wall opening via a conveyor at a rate of 3,000 pounds per hour. It is found that operation at 1500°F. can burn about 1½ tons per hour of the spent potlinings when run on a continuous basis. Air in the combustor has a residence time of about 2 seconds and is caused to flow upward at a velocity of about 12-20 feet per second.

By operating exactly the same equipment with the same feed of spent potlinings at 1200°F. and with a similar velocity of air of about 12-20 feet per second, it is found that the residual cyanide content can be reduced to less than 50 parts per million (p.p.m.) at a throughput of about 8-½ tons per hour. This throughput is equal to an increase in capacity of nearly 500% compared to operation in the combustion mode. Moreover, examination of the treated material shows that less than 10 weight percent of the carbonaceous material of the spent potlinings was combusted.

Although the invention has been described with respect to certain preferred embodiments which constitute the best mode presently known to the inventor for carrying out the invention, other modifications and changes that would be obvious to one having the ordinary skill in this art may be made without departing from the scope of the invention which is defined by the claims appended hereto. For example, either larger or smaller particle size, particulate potlinings may be employed with consequent adjustments in the time-temperature intervals that are used. Changes may also be made in fluidizing gas composition and/or flow rate, in the method of feeding or of product removal, and in the method of heating. Moreover, other gas-solid contactors than a fluidized bed can be used, such as a mechanically agitated bed or just a stagnant bed.

Particular features of the invention are emphasized in the claims that follow.

What is claimed is:

1. A method for the treatment of spent potlinings used in aluminum production, which method comprises:
   reducing spent potlinings to particles having a size of not greater than about 2 inches in any dimension; and
   roasting said particulate potlinings in a nitrogen-containing atmosphere at a temperature of at least about 500°F. but below 1400°F., for a time sufficient to substantially reduce the cyanide content thereof without incurring substantial combustion thereof.

2. A method as recited in claim 1 wherein not more than about 15 weight percent of the carbon content of said spent potlinings is combusted.

3. A method as recited in claim 1 wherein said roasting is carried out for between about 5 and about 10 minutes.

4. A method as recited in claim 3 wherein said roasting is carried out at a temperature of at least about 800°F.

5. A method as recited in claim 1 wherein the temperature is maintained between about 1000°F. and about 1200°F.

6. A method as recited in claim 1 wherein the median particle size of said potlinings is about 1 inch.

7. A method as recited in claim 1 wherein the major portion, by weight, of said potlinings are less than about 1 inch in largest dimension.

8. A method as recited in claim 7 wherein said roasting is carried out in a substantially nitrogen atmosphere.

9. A method as recited in claim 7 wherein not more than about 10 weight percent of the carbon content of the potlinings is combusted.

10. A method as recited in claim 7 wherein said roasting is carried out in an air atmosphere.

11. A method in accordance with claim 1 wherein said roasting is carried out in a fluidized-bed.

12. A method in accordance with claim 1 wherein said roasting is carried out in a circulating bed combustor to which a source of fuel other than said potlinings is supplied.

13. A method in accordance with claim 1 wherein said roasting is carried out in a rotary kiln.

14. A method for the treatment of spent potlinings used in aluminum production, which method comprises
   reducing spent potlinings in size to particles having a size of not greater than about 2 inches in any dimension; and
   roasting said particulate potlinings in a nitrogen-containing atmosphere at a temperature between about 800°F. and 1300°F., for a least about 5 minutes to substantially reduce the cyanide content thereof without incurring substantial combustion thereof.

15. A method as recited in claim 14 wherein said roasting is carried out for an average residence time between about 5 and about 15 minutes.

16. A method as recited in claim 14 wherein not more than about 10 weight percent of the carbon content of the potlinings is combusted and wherein said cyanide content is reduced to not more than 100 p.p.m.

* * * * *